United States Patent
Mesecher et al.

(10) Patent No.: US 6,574,271 B2
(45) Date of Patent: *Jun. 3, 2003

(54) SPREAD SPECTRUM RECEIVER FOR RECEIVING A DATA SIGNAL USING AN ADAPTIVE ALGORITHM

(75) Inventors: David K. Mesecher, Huntington Station, NY (US); Alexander Reznik, Levittown, NY (US); Donald Grieco, Manhassett, NY (US); Gary Cheung, Whitestone, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 25 days.

This patent is subject to a terminal disclaimer.

(21) Appl. No.: 09/892,369

(22) Filed: Jun. 27, 2001

(65) Prior Publication Data

US 2001/0038666 A1 Nov. 8, 2001

Related U.S. Application Data

(63) Continuation of application No. 09/659,858, filed on Sep. 11, 2000, which is a continuation-in-part of application No. 09/602,963, filed on Jun. 23, 2000, which is a continuation of application No. 09/394,452, filed on Sep. 10, 1999, now Pat. No. 6,115,406.

(51) Int. Cl.[7] .................................. H04B 1/69
(52) U.S. Cl. ................ 375/148; 375/346; 375/144; 370/342
(58) Field of Search ................ 375/147, 148, 375/346, 144; 370/320, 335, 342

(56) References Cited

U.S. PATENT DOCUMENTS

| | | |
|---|---|---|
| 4,901,307 A | 2/1990 | Gilhousen et al. |
| 5,652,764 A | 7/1997 | Kanzaki et al. |
| 5,694,388 A | 12/1997 | Sawahashi et al. |
| 5,809,020 A | 9/1998 | Bruckert et al. |
| 5,812,542 A * | 9/1998 | Bruckert et al. ............ 370/335 |
| 5,886,987 A | 3/1999 | Yoshida et al. |
| 5,952,968 A | 9/1999 | McDowell |

(List continued on next page.)

FOREIGN PATENT DOCUMENTS

| | | |
|---|---|---|
| EP | 0755127 A2 | 1/1997 |
| EP | 0881781 A2 | 12/1998 |
| EP | 0899894 A2 | 3/1999 |
| GB | 2280575 A | 2/1995 |

OTHER PUBLICATIONS

Milap Majmundar, Nevena Sandhu, and Jeffrey H. Reed, "Adaptive Single–User Receivers for Direct–Sequence Spread–Spectrum CDMA Systems," IEEE Transactions on Vehicular Technology, vol. 49, No. 2, Mar. 2000, pp. 379–389.

(List continued on next page.)

Primary Examiner—Temesghen Ghebretinsae
(74) Attorney, Agent, or Firm—Volpe and Koenig, P.C.

(57) ABSTRACT

A code division multiple access communication system transmits a pilot and traffic signal over a shared spectrum. The pilot and traffic signal have an associated code. Signals are received over the shared spectrum. The received signals are sampled. The samples are delayed to produce a window. The window has evenly time spaced samples. Each window sample is despread with a pilot code. A weight for each despread pilot code window sample is determined using an adaptive algorithm. Each window sample is despread with a traffic code. Each despread traffic code window sample is weighted with a corresponding weight of the determined weights. The despread traffic code window sample are combined as data of the traffic signal.

18 Claims, 22 Drawing Sheets

U.S. PATENT DOCUMENTS 5,982,327 A 11/1999 Vook et al.
5,991,332 A 11/1999 Lomp et al.
6,009,074 A * 12/1999 Kim et al. .................. 370/209
6,154,443 A 11/2000 Huang et al.

OTHER PUBLICATIONS

Matti Latva–aho and Markku J. Juntti, "LMMSE Detection for DS–CDMA Systems in Fading Channels," IEEE Transactions on Communications, vol. 48, No. 2, Feb. 2000, pp. 194–199.

Kaveh Pahlavan and James W. Matthews, "Performance of Adaptive Matched Filter Receivers Over Fading Multipath Channels," IEEE Transactions on Communications, vol. 38, No. 12, Dec. 1990, pp. 2106–2113.

Jeffrey R. Foerster and Laurence B. Milstein, "Coding for a Coherent DS–CDMA System Employing an MMSE Receiver in a Rayleigh Fading Channel," IEEE Transactions on Communications, vol. 48, No. 6, Jun. 2000, pp. 1012–1021.

* cited by examiner

SPREAD SPECTRUM RECEIVER FOR RECEIVING A DATA SIGNAL USING AN ADAPTIVE ALGORITHM

This application is a continuation of application Ser. No. 09/659,858, filed Sep. 11, 2000, which is a continuation-in-part of application Ser. No. 09/602,963, filed Jun. 23, 2000, which is a continuation of application Ser. No. 09/394,452, filed Sep. 10, 1999, now U.S. Pat. No. 6,115,406.

BACKGROUND

The present invention relates generally to signal transmission and reception in a wireless code division multiple access (CDMA) communication system. More specifically, the invention relates to reception of signals to reduce interference in a wireless CDMA communication system.

A prior art CDMA communication system is shown in FIG. 1. The communication system has a plurality of base stations 20–32. Each base station 20 communicates using spread spectrum CDMA with user equipment (UEs) 34–38 within its operating area. Communications from the base station 20 to each UE 34–38 are referred to as downlink communications and communications from each UE 34–38 to the base station 20 are referred to as uplink communications.

Shown in FIG. 2 is a simplified CDMA transmitter and receiver. A data signal having a given bandwidth is mixed by a mixer 40 with a pseudo random chip code sequence producing a digital spread spectrum signal for transmission by an antenna 42. Upon reception at an antenna 44, the data is reproduced after correlation at a mixer 46 with the same pseudo random chip code sequence used to transmit the data. By using different pseudo random chip code sequences, many data signals use the same channel bandwidth. In particular, a base station 20 will communicate signals to multiple UEs 34–38 over the same bandwidth.

For timing synchronization with a receiver, an unmodulated pilot signal is used. The pilot signal allows respective receivers to synchronize with a given transmitter allowing despreading of a data signal at the receiver. In a typical CDMA system, each base station 20 sends a unique pilot signal received by all UEs 34–38 within communicating range to synchronize forward link transmissions. Conversely, in some CDMA systems, for example in the B-CDMA™ air interface, each UE 34–38 transmits a unique assigned pilot signal to synchronize reverse link transmissions.

When a UE 34–36 or a base station 20–32 is receiving a specific signal, all the other signals within the same bandwidth are noise-like in relation to the specific signal. Increasing the power level of one signal degrades all other signals within the same bandwidth. However, reducing the power level too far results in an undesirable received signal quality. One indicator used to measure the received signal quality is the signal to noise ratio (SNR). At the receiver, the magnitude of the desired received signal is compared to the magnitude of the received noise. The data within a transmitted signal received with a high SNR is readily recovered at the receiver. A low SNR leads to loss of data.

To maintain a desired signal to noise ratio at the minimum transmission power level, most CDMA systems utilize some form of adaptive power control. By minimizing the transmission power, the noise between signals within the same bandwidth is reduced. Accordingly, the maximum number of signals received at the desired signal to noise ratio within the same bandwidth is increased.

Although adaptive power control reduces interference between signals in the same bandwidth, interference still exists limiting the capacity of the system. One technique for increasing the number of signals using the same radio frequency (RF) spectrum is to use sectorization. In sectorization, a base station uses directional antennas to divide the base station's operating area into a number of sectors. As a result, interference between signals in differing sectors is reduced. However, signals within the same bandwidth within the same sector interfere with one another. Additionally, sectorized base stations commonly assign different frequencies to adjoining sectors decreasing the spectral efficiency for a given frequency bandwidth. Accordingly, there exists a need for a system which further improves the signal quality of received signals without increasing transmitter power levels.

SUMMARY

A code division multiple access communication system transmits a pilot and traffic signal over a shared spectrum. The pilot and traffic signal have an associated code. Signals are received over the shared spectrum. The received signals are sampled. The samples are delayed to produce a window. The window has evenly time spaced samples. Each window sample is despread with a pilot code. A weight for each despread pilot code window sample is determined using an adaptive algorithm. Each window sample is despread with a traffic code. Each despread traffic code window sample is weighted with a corresponding weight of the determined weights. The despread traffic code window samples are combined as data of the traffic signal.

BRIEF DESCRIPTION OF THE DRAWING(S)

DETAILED DESCRIPTION OF THE PREFERRED EMBODIMENT(S)

Figure 1:
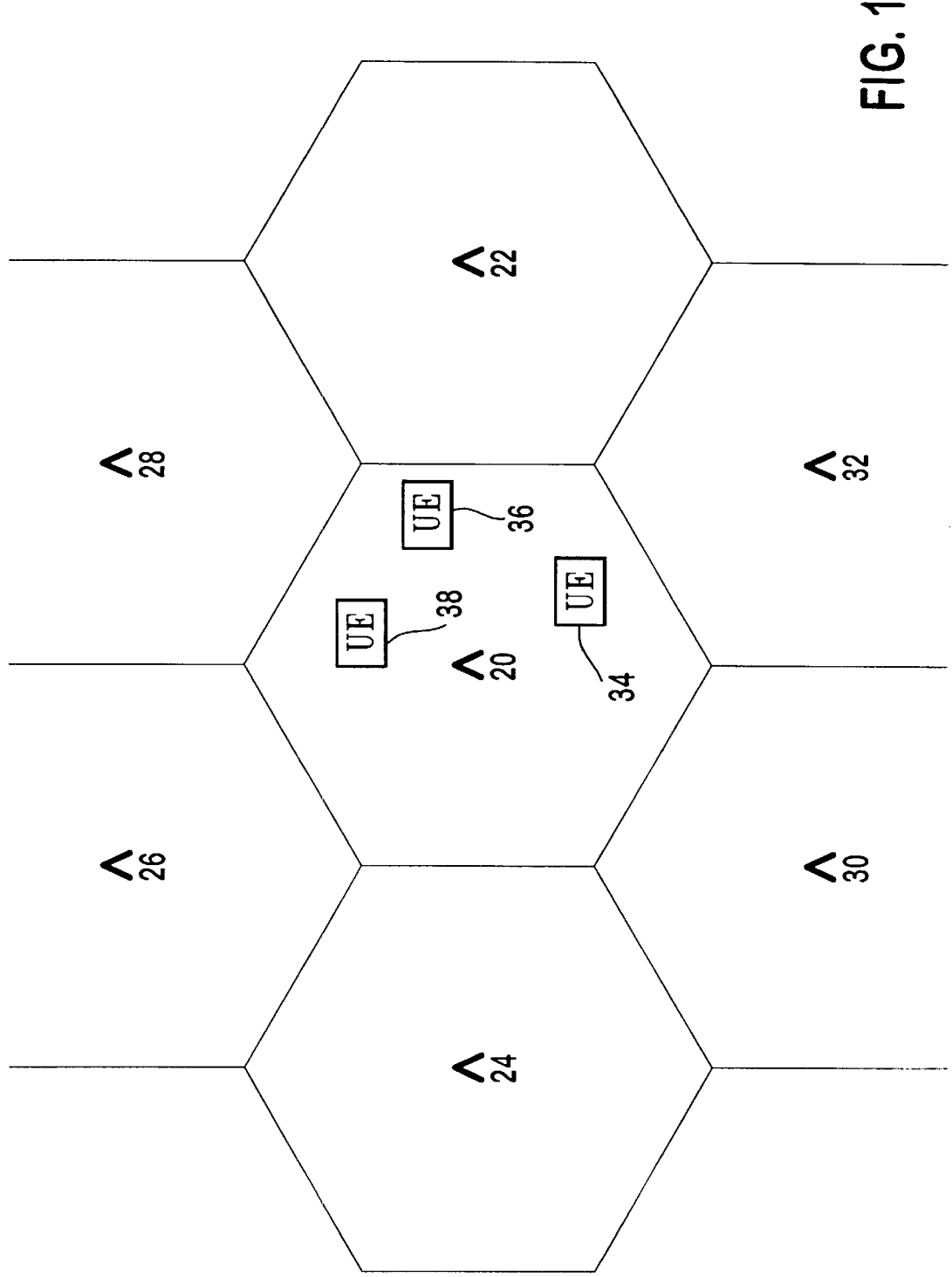
FIG. 1 is a prior art wireless spread spectrum CDMA communication system.
Figure 2:
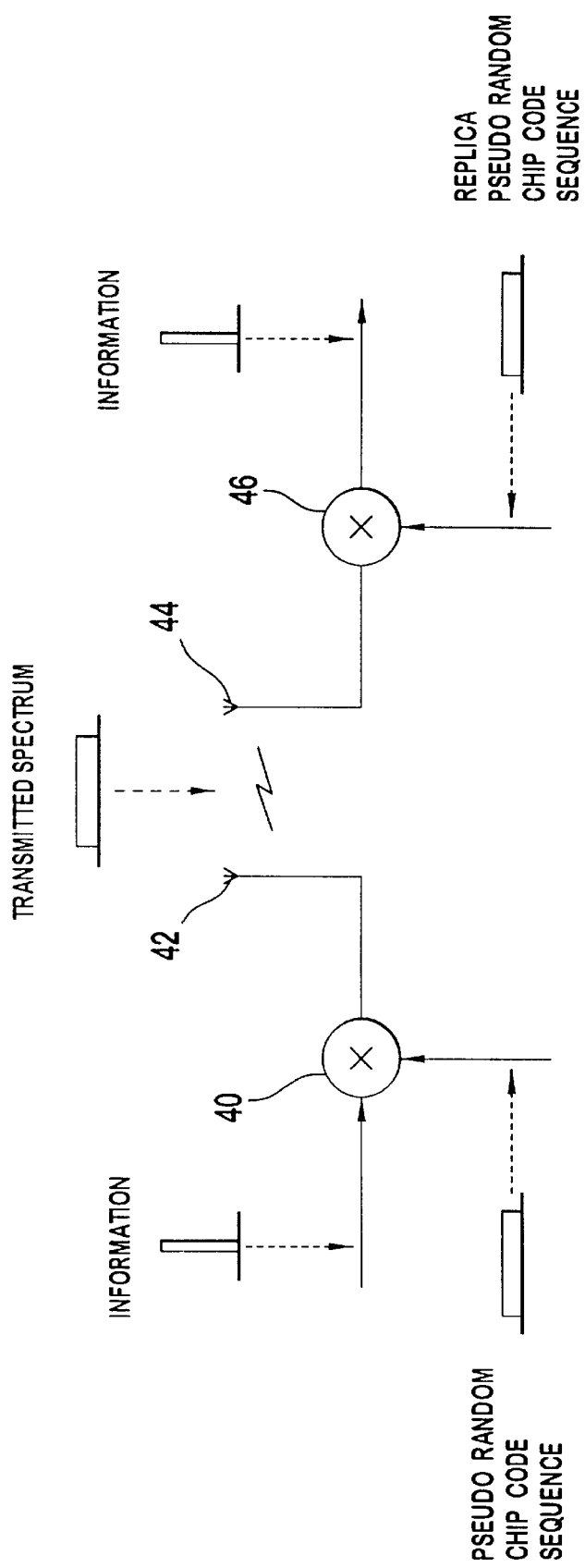
FIG. 2 is a prior art spread spectrum CDMA transmitter and receiver.
Figure 3:
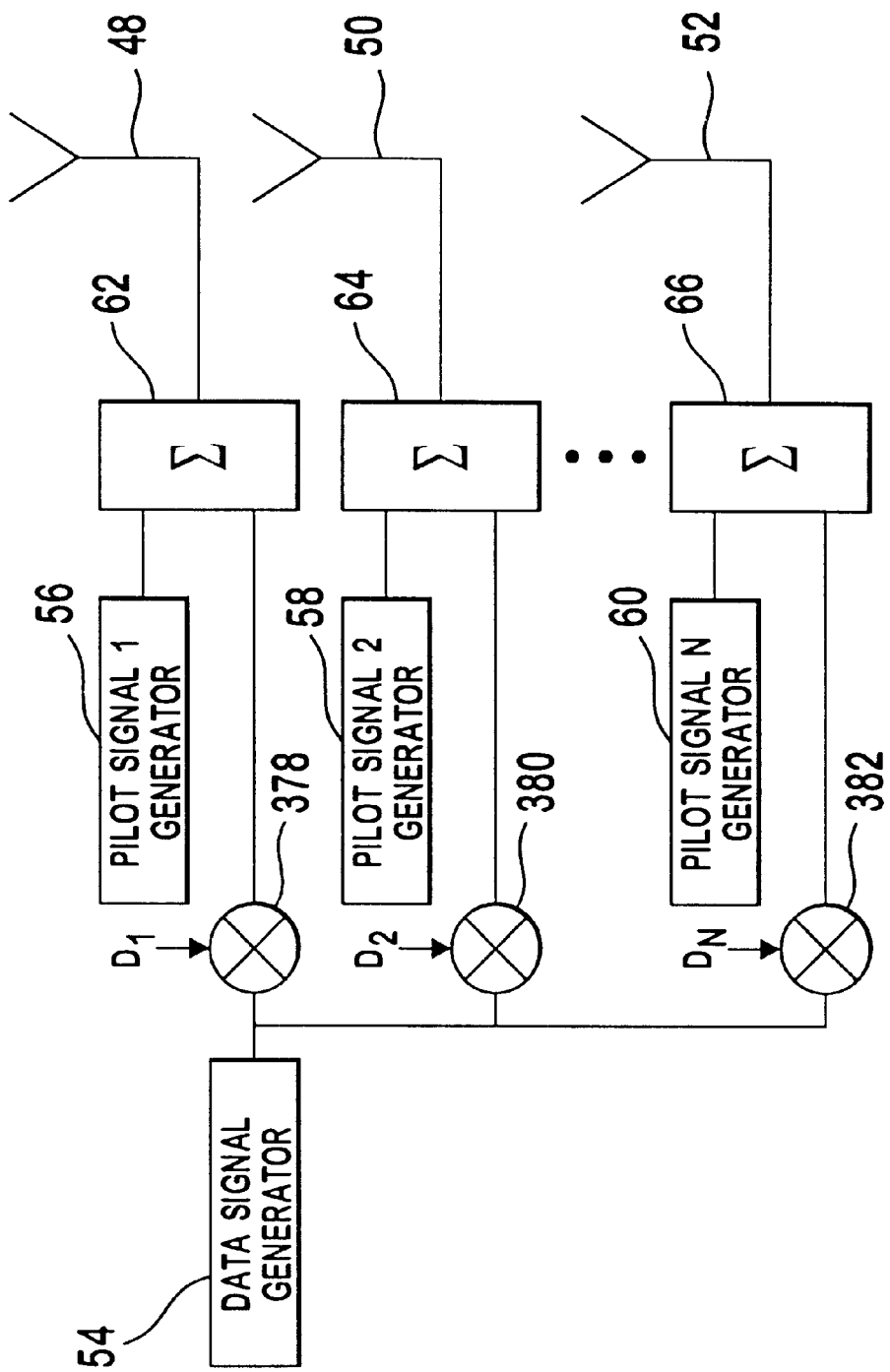
FIG. 3 is the transmitter of the invention.

The preferred embodiments will be described with reference to the drawing figures where like numerals represent like elements throughout. FIG. 3 is a transmitter of the invention. The transmitter has an array of antennas 48–52, preferably 3 or 4 antennas. For use in distinguishing each antenna 48–52, a different signal is associated with each antenna 56–60. The preferred signal to associate with each antenna is a pilot signal as shown in FIG. 3. Each spread pilot signal is generated by a pilot signal generator 56–60 using a different pseudo random chip code sequence and is combined by combiners 62–66 with the respective spread data signal. Each spread data signal is generated using data signal generator 54 by mixing at mixers 378–382 the generated data signal with a different pseudo random chip code sequence per antenna 48–52, $D_1$–$D_N$. The combined signals are modulated to a desired carrier frequency and radiated through the antennas 48–52 of the array.

By using an antenna array, the transmitter utilizes spacial diversity. If spaced far enough apart, the signals radiated by each antenna 48–52 will experience different multipath distortion while traveling to a given receiver. Since each signal sent by an antenna 48–52 will follow multiple paths to a given receiver, each received signal will have many multipath components. These components create a virtual communication channel between each antenna 48–52 of the transmitter and the receiver. Effectively, when signals transmitted by one antenna 48–52 over a virtual channel to a given receiver are fading, signals from the other antennas 48–52 are used to maintain a high received SNR. This effect is achieved by the adaptive combining of the transmitted signals at the receiver.

Figure 4:
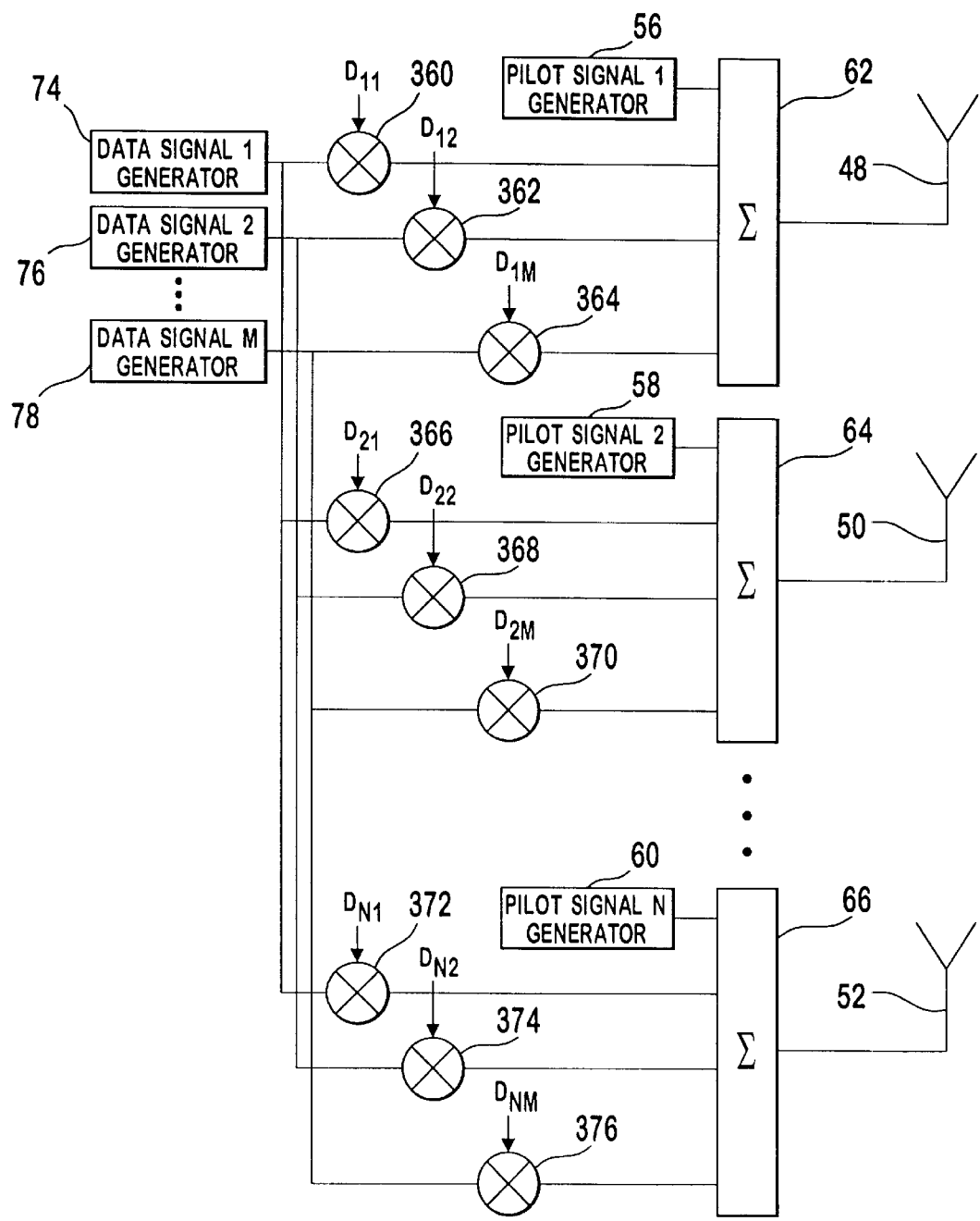
FIG. 4 is the transmitter of the invention transmitting multiple data signals.

FIG. 4 shows the transmitter as used in a base station 20 to send multiple data signals. Each spread data signal is generated by mixing at mixers 360–376 a corresponding data signal from generators 74–78 with differing pseudo random chip code sequences $D_{11}$–$D_{NM}$. Accordingly, each data signal is spread using a different pseudo random chip code sequence per antenna 48–52, totaling N×M code sequences. N is the number of antennas and M is the number of data signals. Subsequently, each spread data signal is combined with the spread pilot signal associated with the antenna 48–52. The combined signals are modulated and radiated by the antennas 48–52 of the array.

Figure 5:
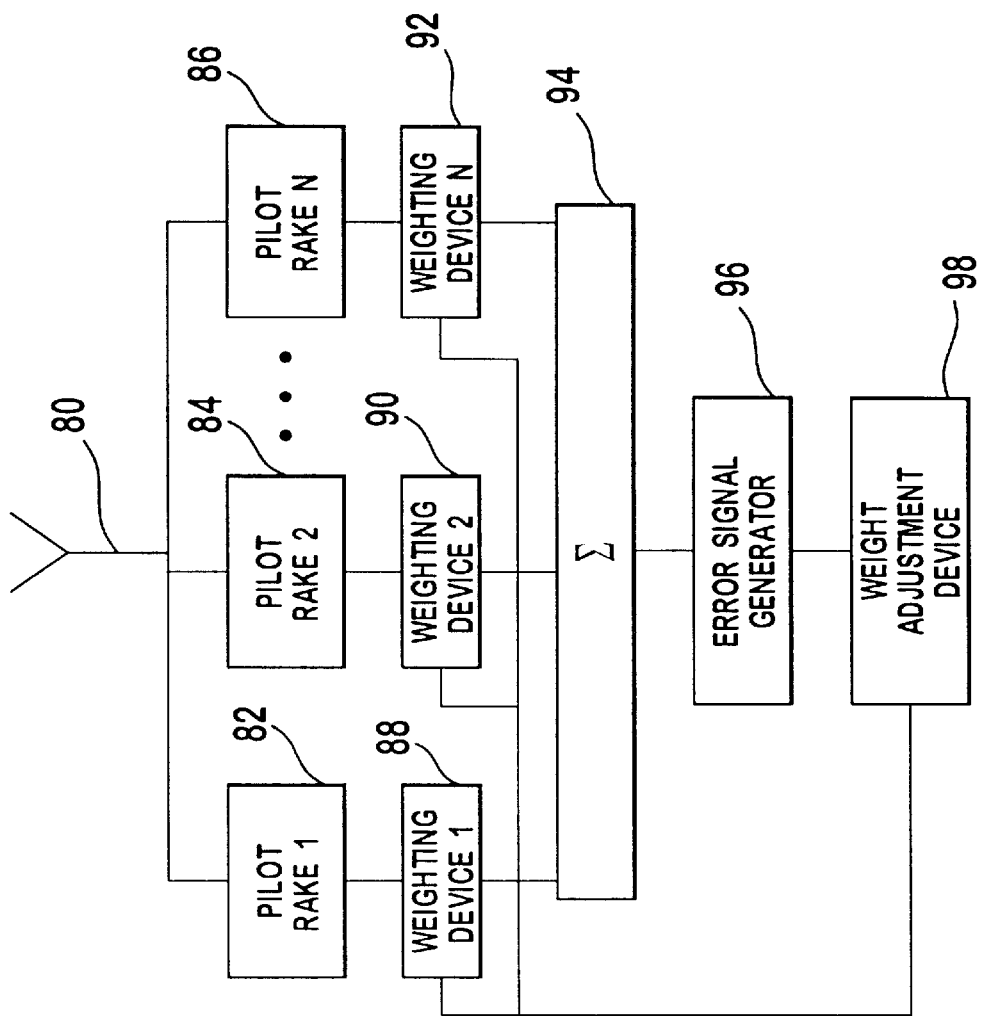
FIG. 5 is the pilot signal receiving circuit of the invention.

The pilot signal receiving circuit is shown in FIG. 5. Each of the transmitted pilot signals is received by the antenna 80. For each pilot signal, a despreading device, such as a RAKE 82–86 as shown in the FIG. 5 or a vector correlator, is used to despread each pilot signal using a replica of the corresponding pilot signal's pseudo random chip code sequence. The despreading device also compensates for multipath in the communication channel. Each of the recovered pilot signals is weighted by a weighting device 88–92. Weight refers to both magnitude and phase of the signal. Although the weighting is shown as being coupled to a RAKE, the weighting device preferably also weights each finger of the RAKE. After weighting, all of the weighted recovered pilot signals are combined in a combiner 94. Using an error signal generator 98, an estimate of the pilot signal provided by the weighted combination is used to create an error signal. Based on the error signal, the weights of each weighting device 88–92 are adjusted to minimize the error signal using an adaptive algorithm, such as least mean squared (LMS) or recursive least squares (RLS). As a result, the signal quality of the combined signal is maximized.

Figure 6:
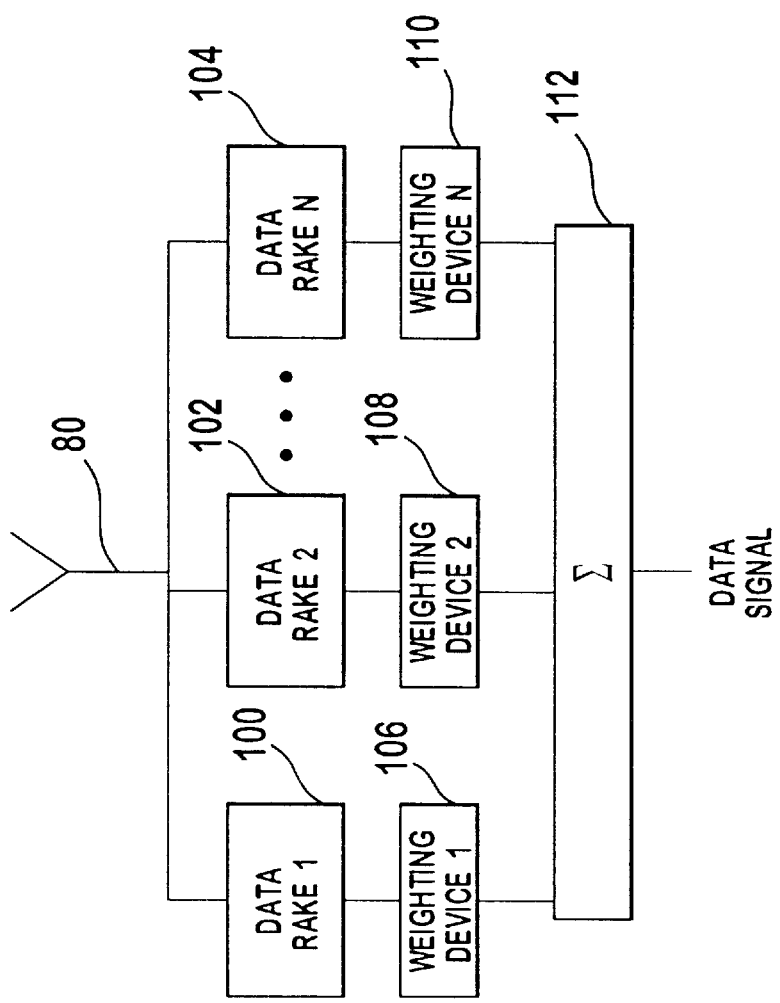
FIG. 6 is the data signal receiving circuit of the invention.

FIG. 6 depicts a data signal receiving circuit using the weights determined by the pilot signal recovery circuit. The transmitted data signal is recovered by the antenna 80. For each antenna 48–52 of the transmitting array, the weights from a corresponding despreading device, shown as a RAKE 82–86, are used to filter the data signal using a replica of the data signal's spreading code used for the corresponding transmitting antenna. Using the determined weights for each antenna's pilot signal, each weighting device 106–110 weights the RAKE's despread signal with the weight associated with the corresponding pilot. For instance, the weighting device 88 corresponds to the transmitting antenna 48 for pilot signal 1. The weight determined by the pilot RAKE 82 for pilot signal 1 is also applied at the weighting device 106 of FIG. 6. Additionally, if the weights of the RAKE's fingers were adjusted for the corresponding pilots signal's RAKE 82–86, the same weights will be applied to the fingers of the data signal's RAKE 100–104. After weighting, the weighted signals are combined by the combiner 112 to recover the original data signal.

By using the same weights for the data signal as used with each antenna's pilot signal, each RAKE 82–86 compensates for the channel distortion experienced by each antenna's signals. As a result, the data signal receiving circuit optimizes the data signals reception over each virtual channel. By optimally combining each virtual channel's optimized signal, the received data signal's signal quality is increased.

Figure 7:
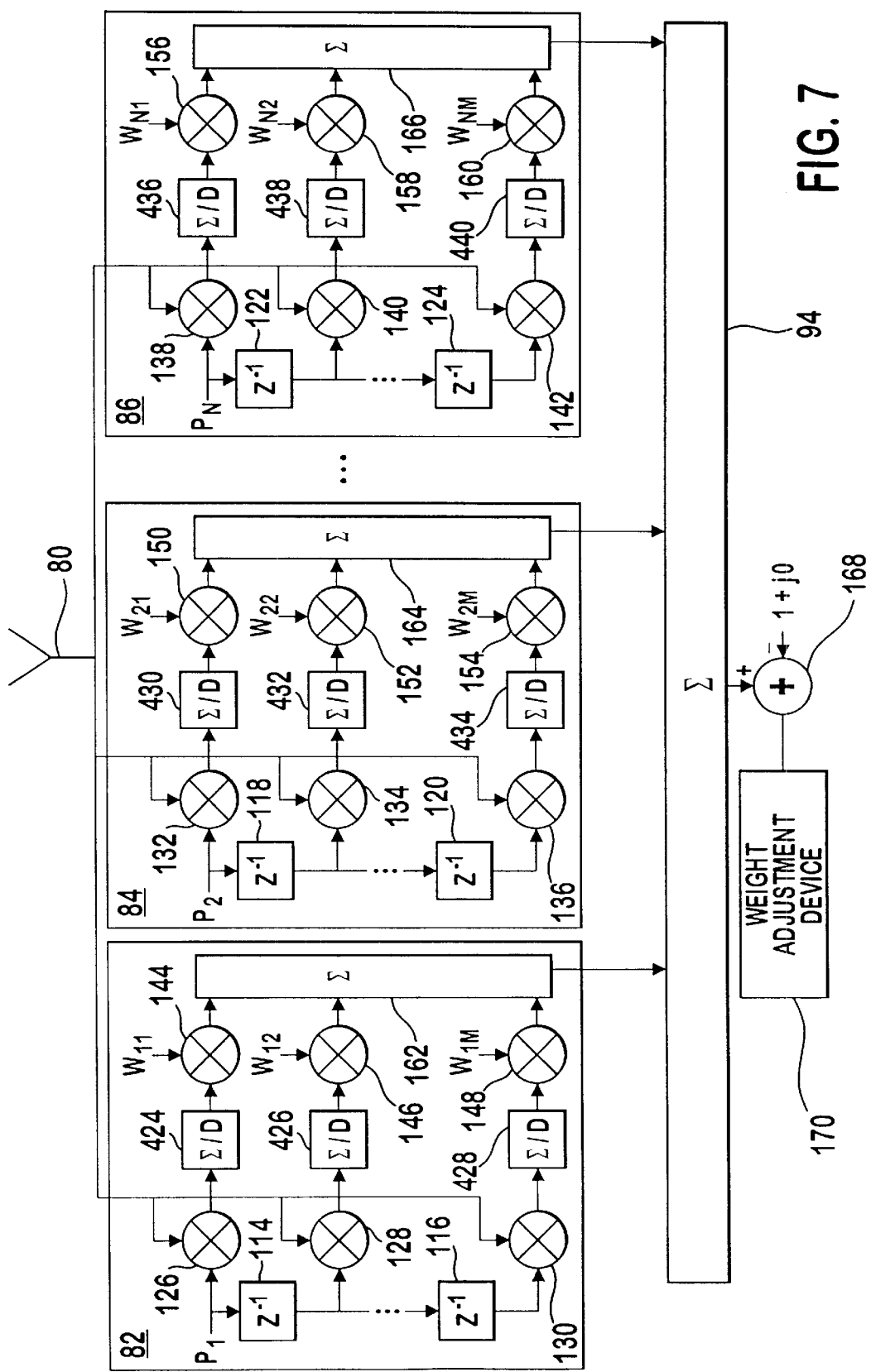
FIG. 7 is an embodiment of the pilot signal receiving circuit.

FIG. 7 shows an embodiment of the pilot signal recovery circuit. Each of the transmitted pilots are recovered by the receiver's antenna 80. To despread each of the pilots, each RAKE 82–86 utilizes a replica of the corresponding pilot's pseudo random chip code sequence, $P_1$–$P_N$. Delayed versions of each pilot signal are produced by delay devices 114–124. Each delayed version is mixed by a mixer 126–142 with the received signal. The mixed signals pass through sum and dump circuits 424–440 and are weighted using mixers 144–160 by an amount determined by the weight adjustment device 170. The weighted multipath components for each pilot are combined by a combiner 162–164. Each pilot's combined output is combined by a combiner 94. Since a pilot signal has no data, the combined pilot signal should have a value of 1+j0. The combined pilot signal is compared to the ideal value, 1+j0, at a subtractor 168. Based on the deviation of the combined pilot signal from the ideal, the weight of the weighting devices 144–160 are adjusted using an adaptive algorithm by the weight adjustment device 170.

Figure 8:
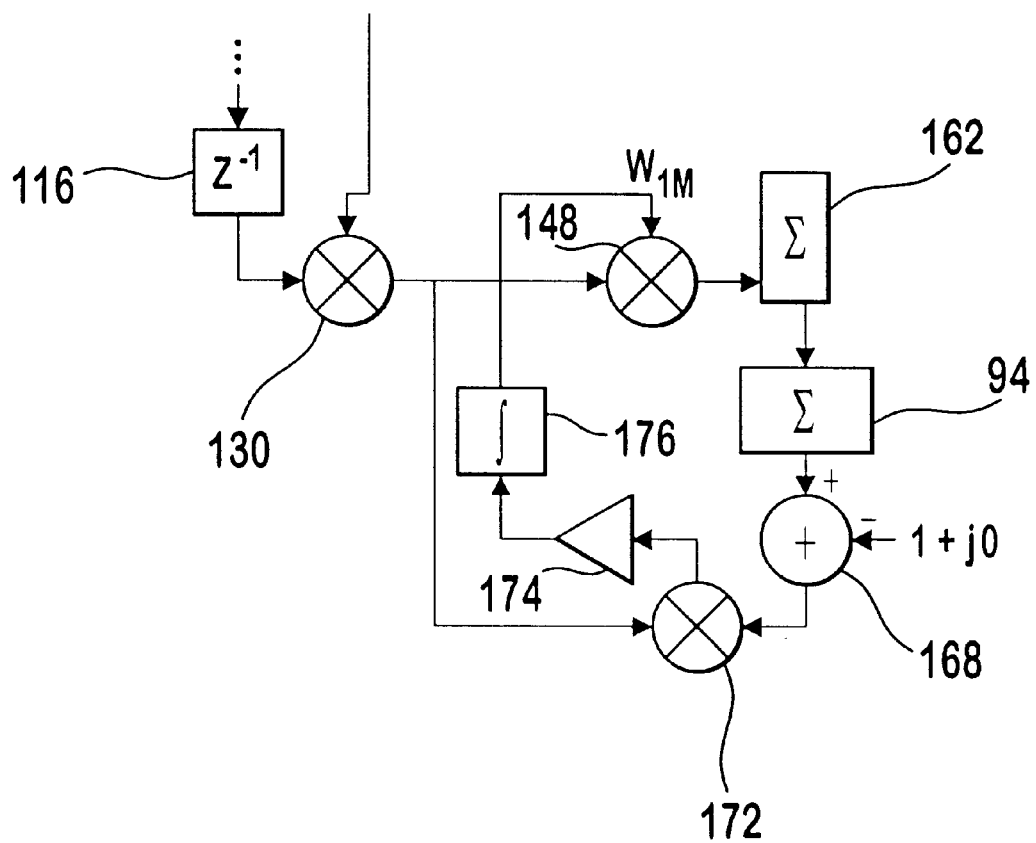
FIG. 8 is a least mean squared weighting circuit.

A LMS algorithm used for generating a weight is shown in FIG. 8. The output of the subtractor 168 is multiplied using a mixer 172 with the corresponding despread delayed version of the pilot. The multiplied result is amplified by an amplifier 174 and integrated by an integrator 176. The integrated result is used to weight, $W_{1M}$, the RAKE finger.

Figure 9:
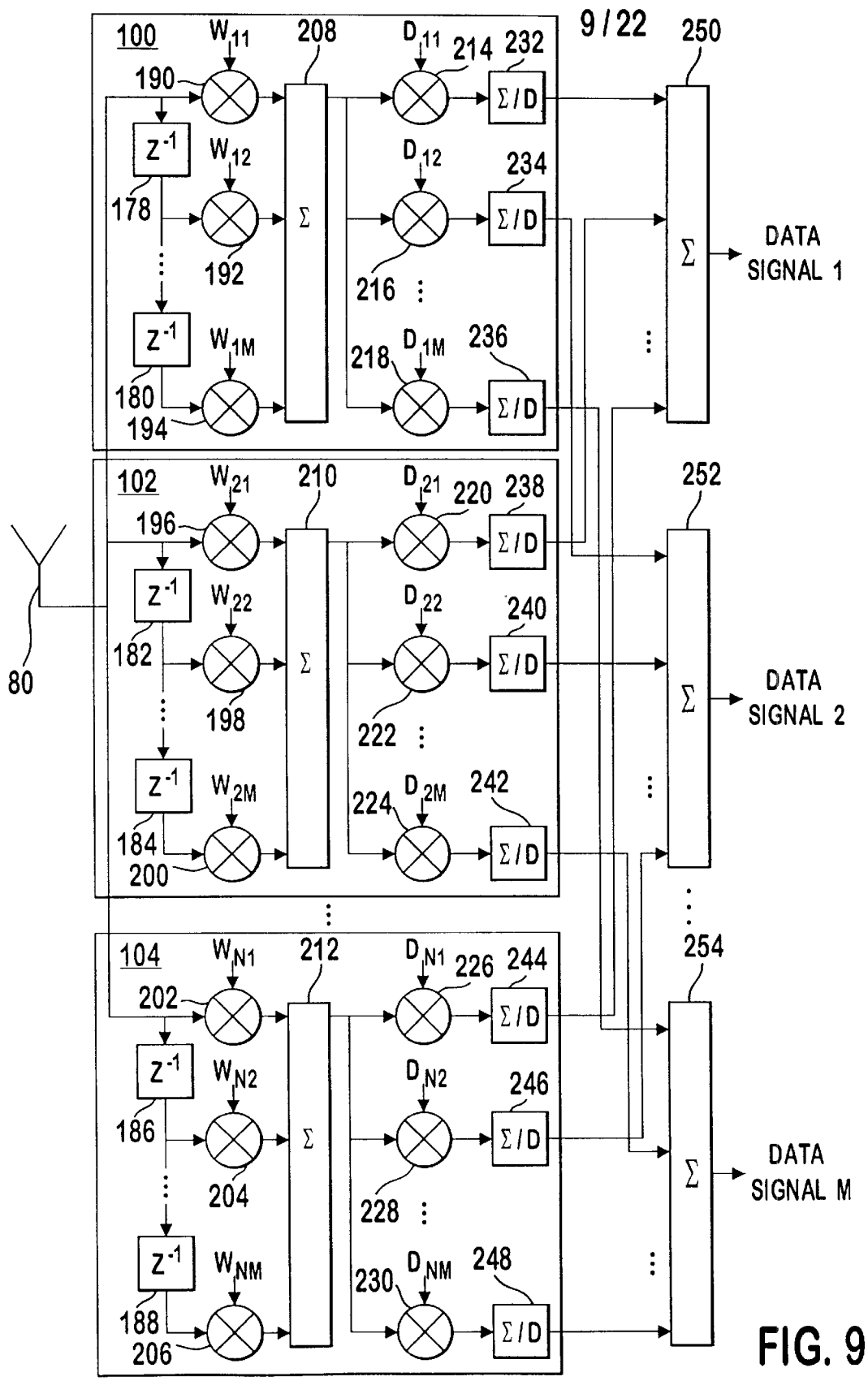
FIG. 9 is the data signal receiving circuit used with the pilot signal receiving circuit of FIG. 7.

The data receiving circuit used with the embodiment of FIG. 7 is show for a base station receiver in FIG. 9. The received signal is sent to a set of RAKEs 100–104 respectively associated with each antenna 48–52 of the array. Each RAKE 100–104, produces delayed versions of the received signal using delay devices 178–188. The delayed versions are weighted using mixers 190–206 based on the weights determined for the corresponding antenna's pilot signal. The weighted data signals for a given RAKE 100–104 are combined by a combiner 208–212. One combiner 208–212 is associated with each of the N transmitting antennas 48–52. Each combined signal is despread M times by mixing at a mixer 214–230 the combined signal with a replica of the spreading codes used for producing the M spread data signals at the transmitter, $D_{11}$–$D_{NM}$. Each despread data signal passes through a sum and dump circuit 232–248. For each data signal, the results of the corresponding sum and dump circuits are combined by a combiner 250–254 to recover each data signal.

Figure 10:
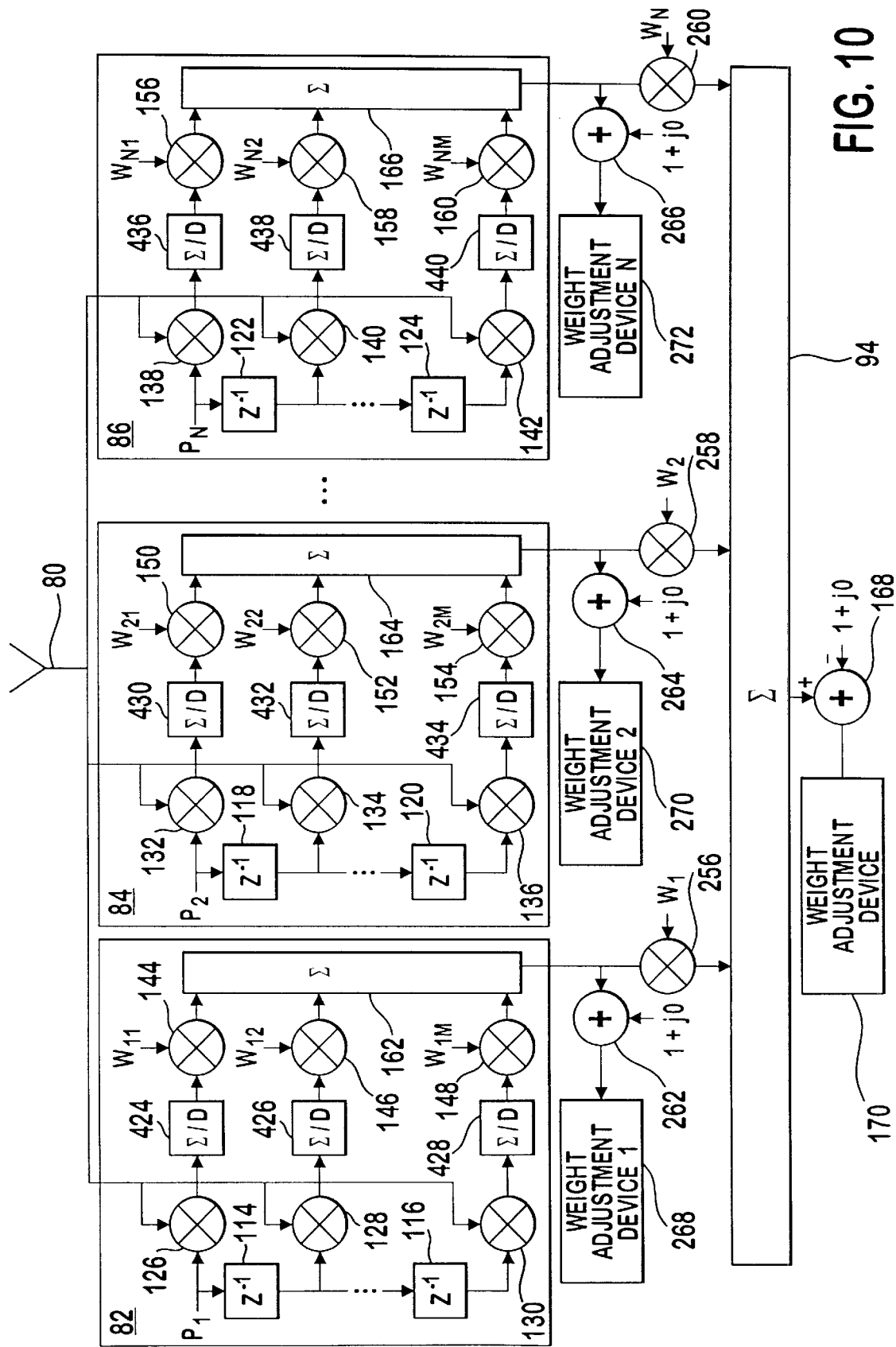
FIG. 10 is an embodiment of the pilot signal receiving circuit where the output of each RAKE is weighted.

Another pilot signal receiving circuit is shown in FIG. 10. The despreading circuits 82–86 of this receiving circuit are the same as FIG. 7. The output of each RAKE 82–86 is weighted using a mixer 256–260 prior to combining the despread pilot signals. After combining, the combined pilot signal is compared to the ideal value and the result of the comparison is used to adjust the weight of each RAKE's output using an adaptive algorithm. To adjust the weights within each RAKE 82–86, the output of each RAKE 82–86 is compared to the ideal value using a subtractor 262–266. Based on the result of the comparison, the weight of each weighting device 144–160 is determined by the weight adjustment devices 268–272.

Figure 11:
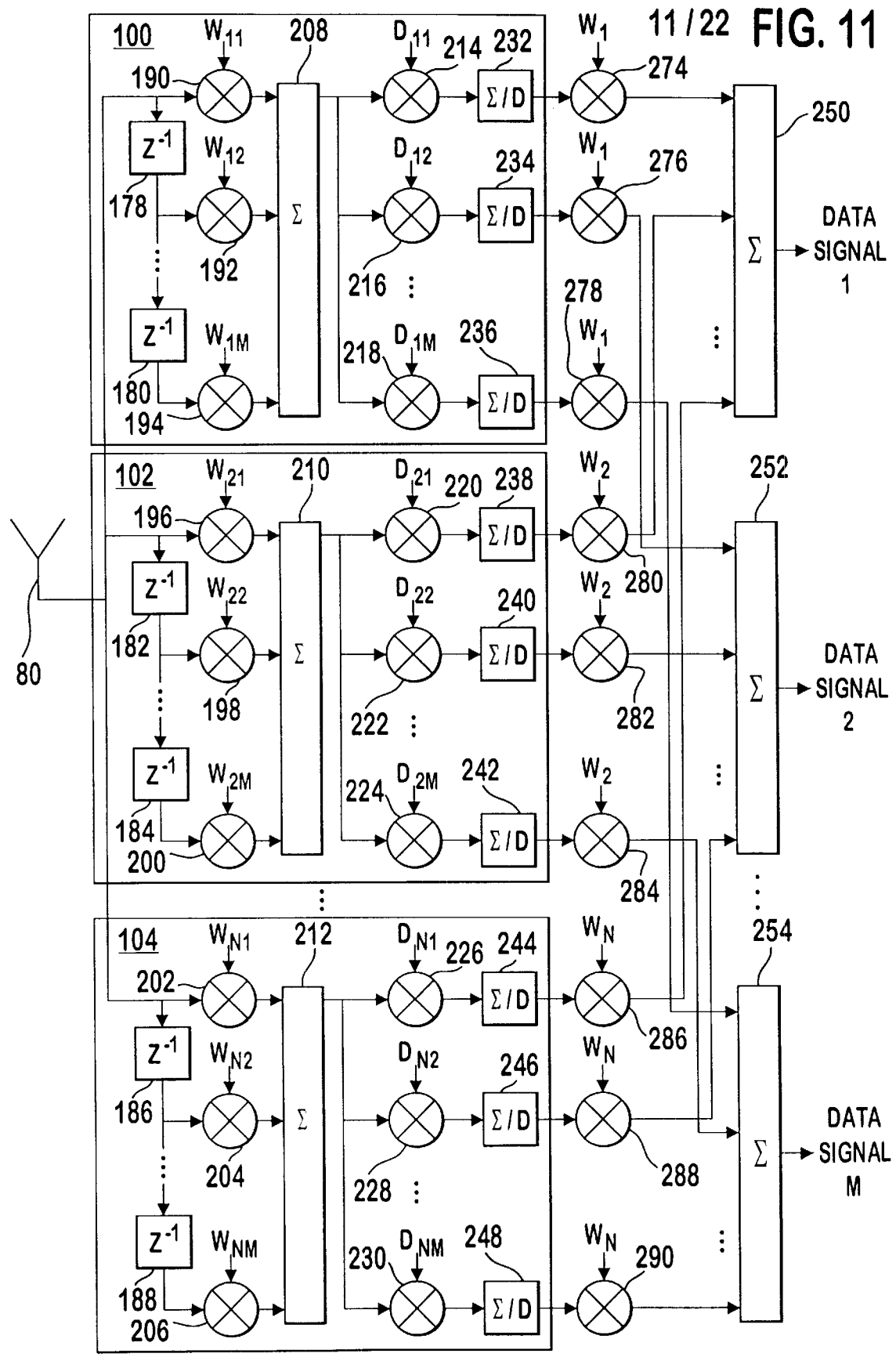
FIG. 11 is the data signal receiving circuit used with the pilot signal receiving circuit of FIG. 10.

The data signal receiving circuit used with the embodiment of FIG. 10 is shown in FIG. 11. This circuit is similar to the data signal receiving circuit of FIG. 9 with the addition of mixers 274–290 for weighting the output of each sum and dump circuit 232–248. The output of each sum and dump circuit 232–248 is weighted by the same amount as the corresponding pilot's RAKE 82–86 was weighted. Alternatively, the output of each RAKE's combiner 208–212 may be weighted prior to mixing by the mixers 214–230 by the amount of the corresponding pilot's RAKE 82–86 in lieu of weighting after mixing.

If the spacing of the antennas 48–52 in the transmitting array is small, each antenna's signals will experience a similar multipath environment. In such cases, the pilot receiving circuit of FIG. 12 may be utilized. The weights for a selected one of the pilot signals are determined in the same manner as in FIG. 10. However, since each pilot travels through the same virtual channel, to simplify the circuit, the same weights are used for despreading the other pilot signals. Delay devices 292–294 produce delayed versions of the received signal. Each delayed version is weighted by a mixer 296–300 by the same weight as the corresponding delayed version of the selected pilot signal was weighted. The outputs of the weighting devices are combined by a combiner 302. The combined signal is despread using replicas of the pilot signals' pseudo random chip code sequences, $P_2$–$P_n$, by the mixers 304–306. The output of each pilot's mixer 304–306 is passed through a sum and dump circuit 308–310. In the same manner as FIG. 10, each despread pilot is weighted and combined.

Figure 12:
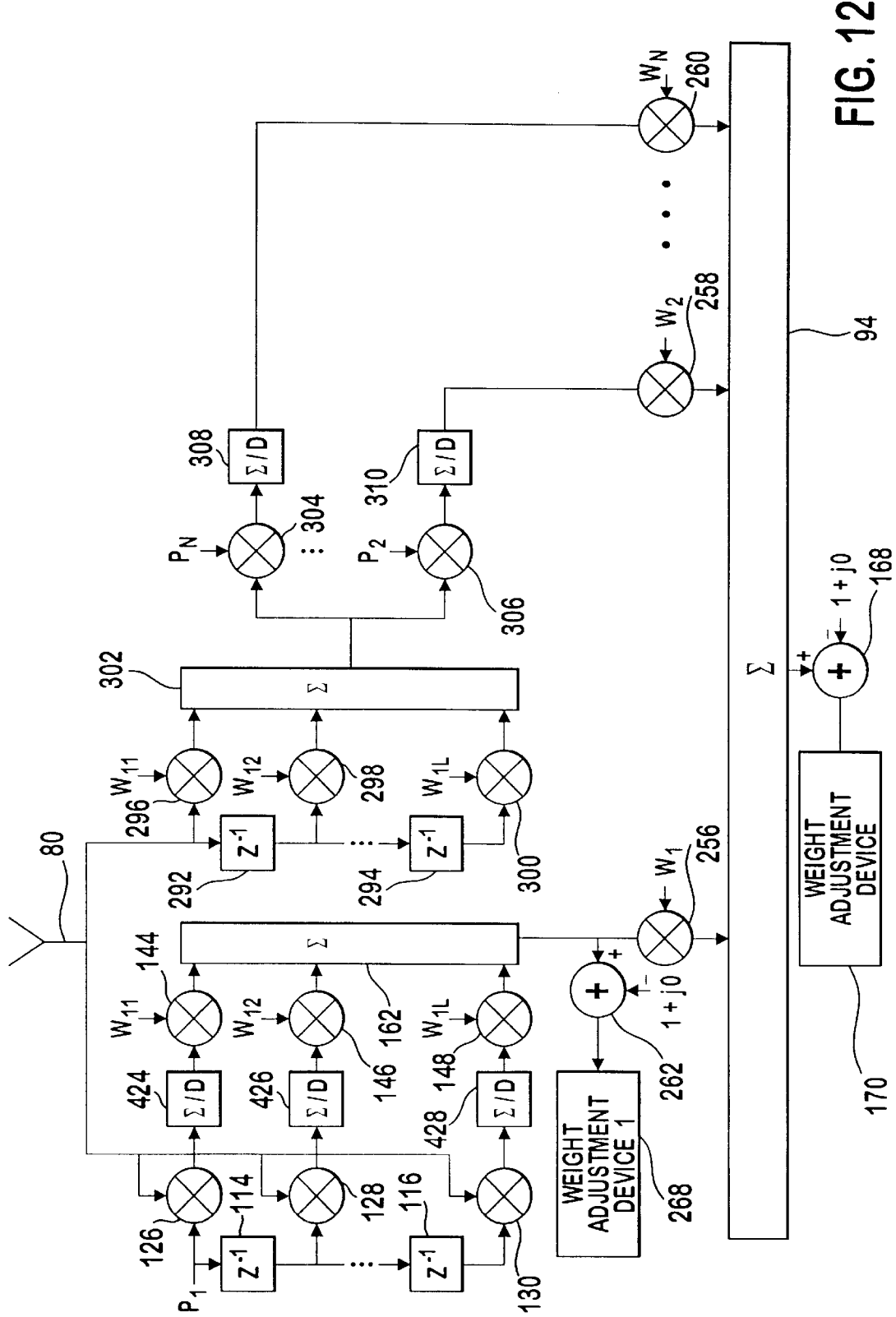
FIG. 12 is an embodiment of the pilot signal receiving circuit where the antennas of the transmitting array are closely spaced.
Figure 13:
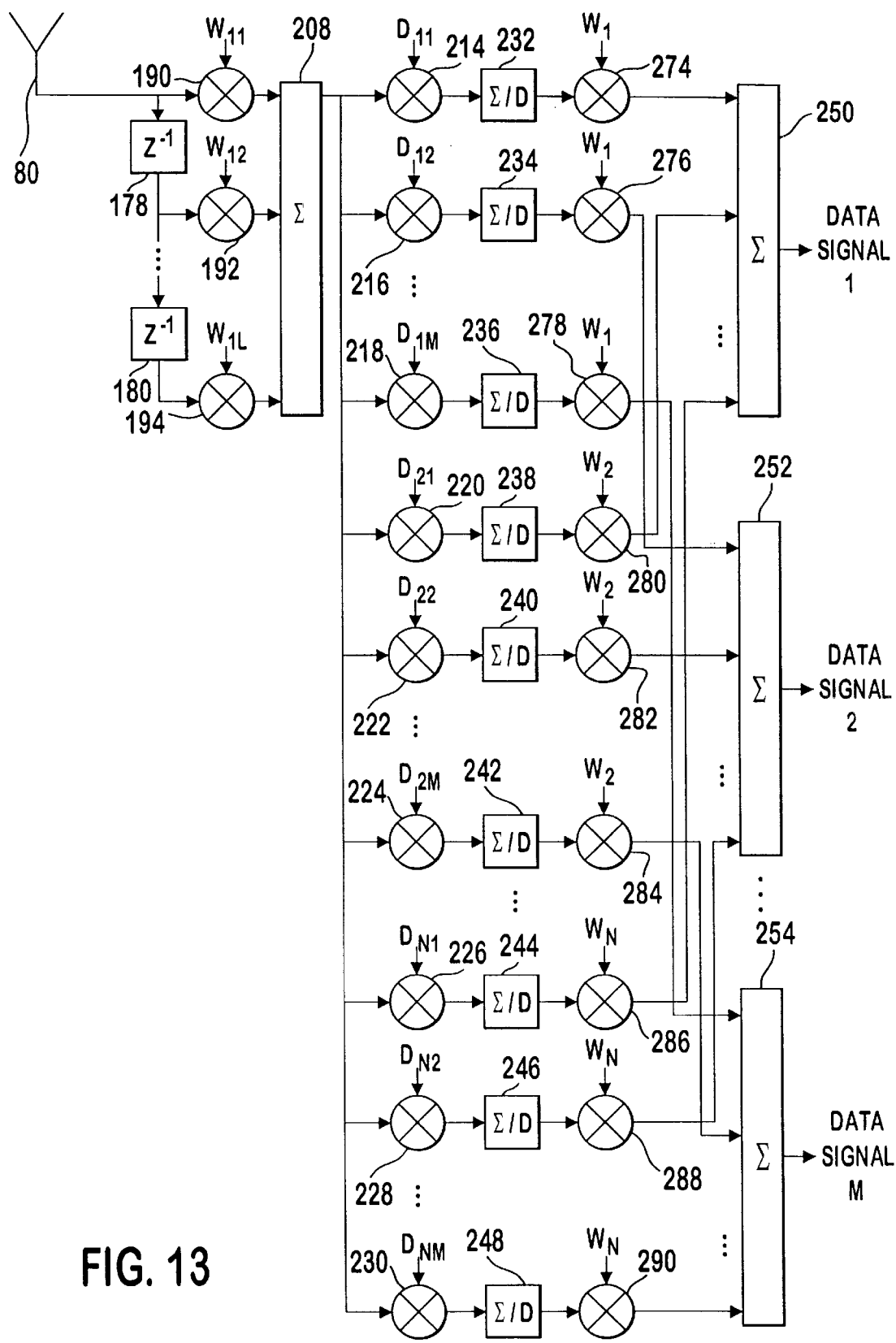
FIG. 13 is the data signal receiving circuit used with the pilot signal receiving circuit of FIG. 12.

The data signal recovery circuit used with the embodiment of FIG. 12 is shown in FIG. 13. Delay devices 178–180 produce delayed versions of the received signal. Each delayed version is weighted using a mixer 190–194 by the same weight as used by the pilot signals in FIG. 12. The outputs of the mixers are combined by a combiner 208. The output of the combiner 208 is inputted to each data signal despreader of FIG. 13.

Figure 14:
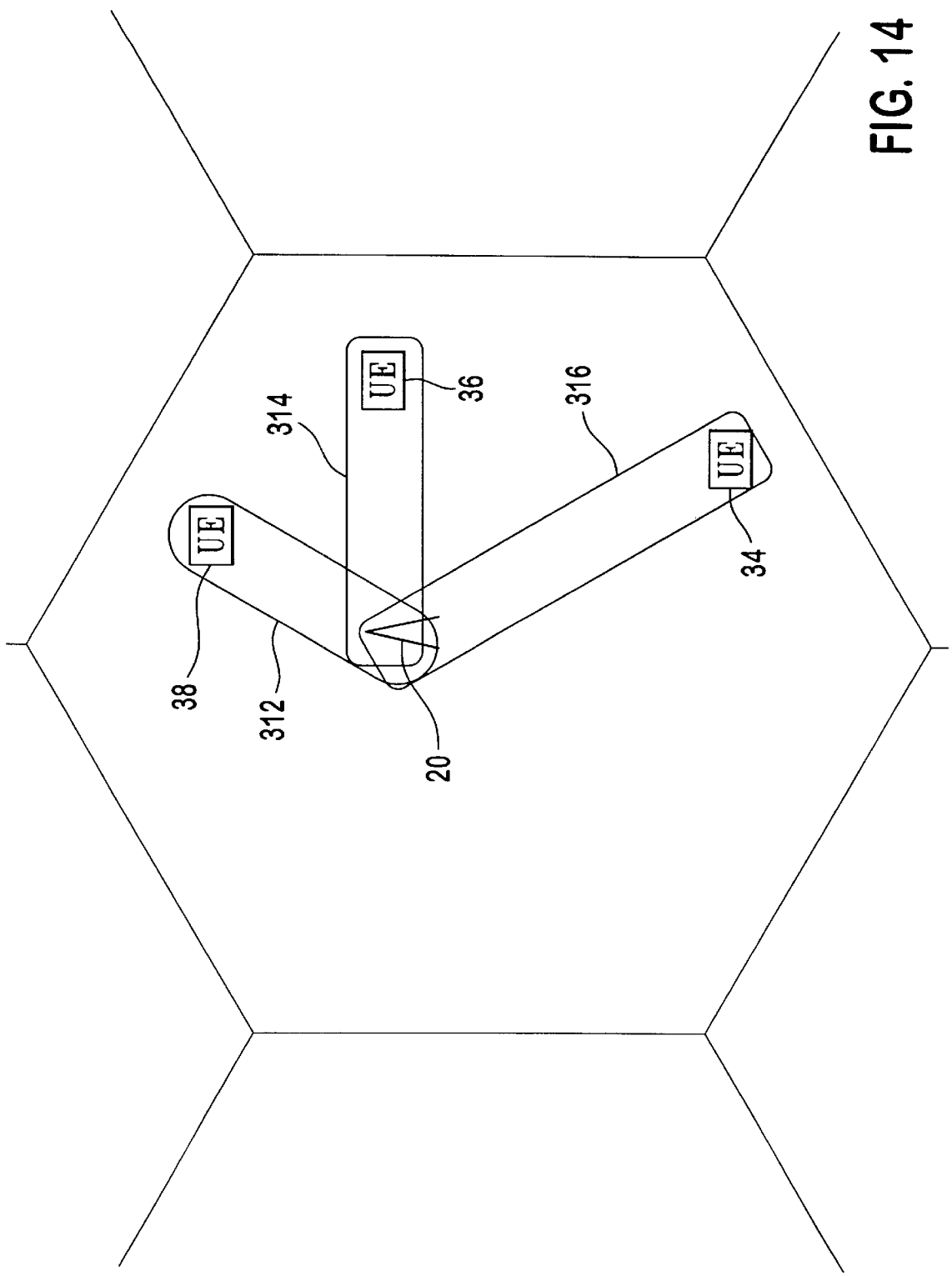
FIG. 14 is an illustration of beam steering in a CDMA communication system.

The invention also provides a technique for adaptive beam steering as illustrated in FIG. 14. Each signal sent by the antenna array will constructively and destructively interfere in a pattern based on the weights provided each antenna 48–52 of the array. As a result, by selecting the appropriate weights, the beam 312–316 of the antenna array is directed in a desired direction.

Figure 15:
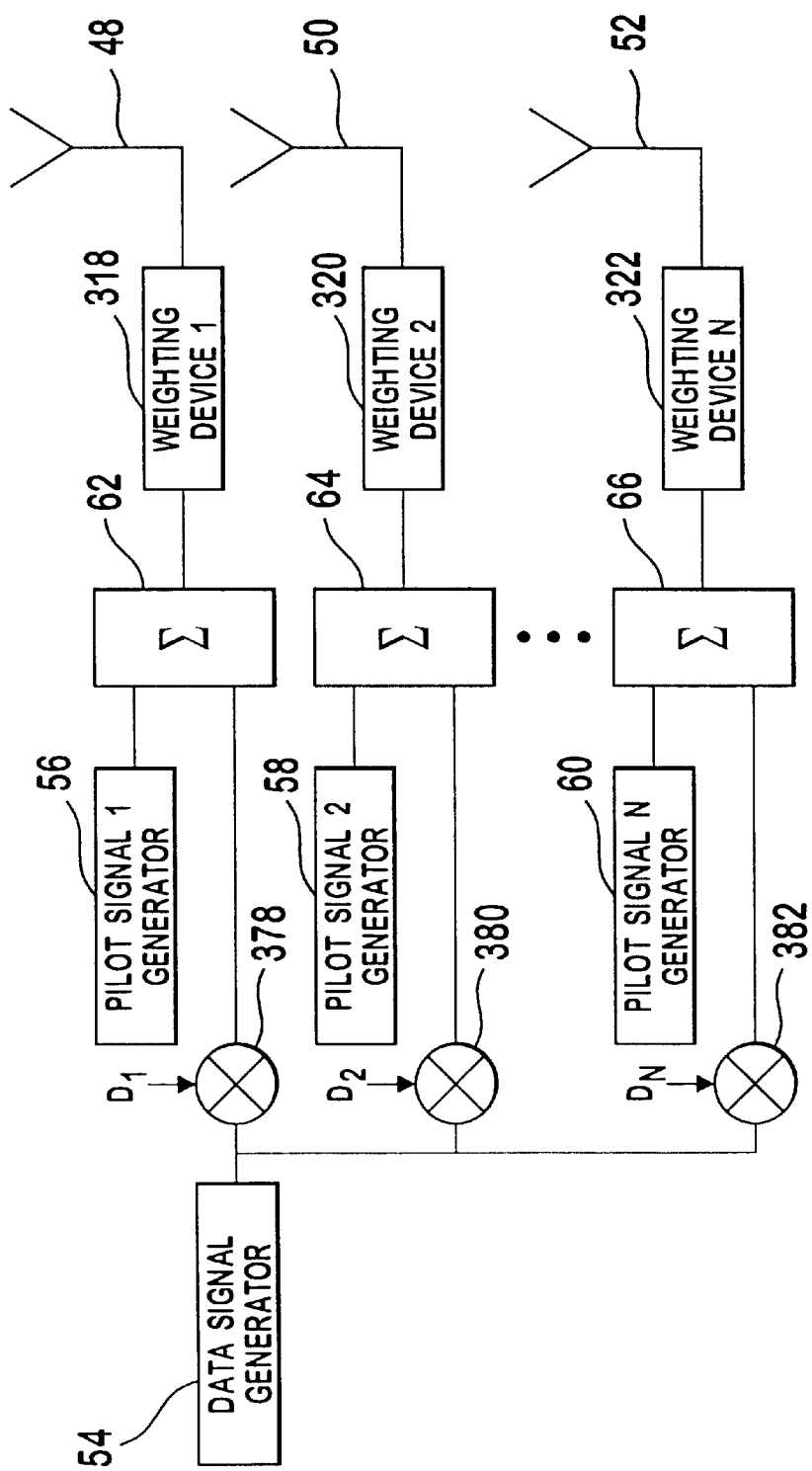
FIG. 15 is a beam steering transmitter.
Figure 16:
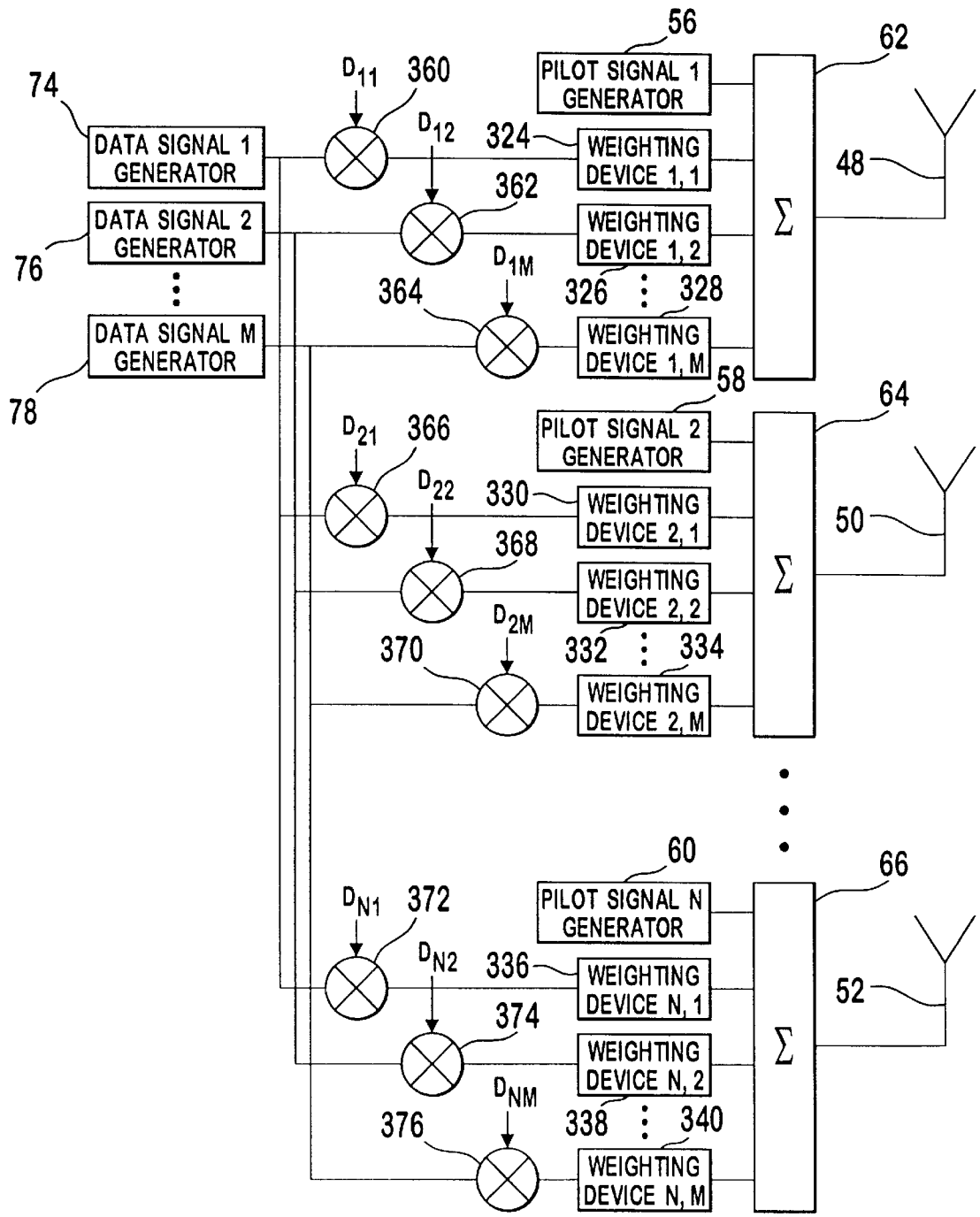
FIG. 16 is a beam steering transmitter transmitting multiple data signals.

FIG. 15 shows the beam steering transmitting circuit. The circuit is similar to the circuit of FIG. 3 with the addition of weighting devices 318–322. A target receiver will receive the pilot signals transmitted by the array. Using the pilot signal receiving circuit of FIG. 5, the target receiver determines the weights for adjusting the output of each pilot's RAKE. These weights are also sent to the transmitter, such as by using a signaling channel. These weights are applied to the spread data signal as shown in FIG. 15. For each antenna, the spread data signal is given a weight by the weighting devices 318–322 corresponding to the weight used for adjusting the antenna's pilot signal at the target receiver providing spatial gain. As a result, the radiated data signal will be focused towards the target receiver. FIG. 16 shows the beam steering transmitter as used in a base station sending multiple data signals to differing target receivers. The weights received by the target receiver are applied to the corresponding data signals by weighting devices 324–340.

Figure 17:
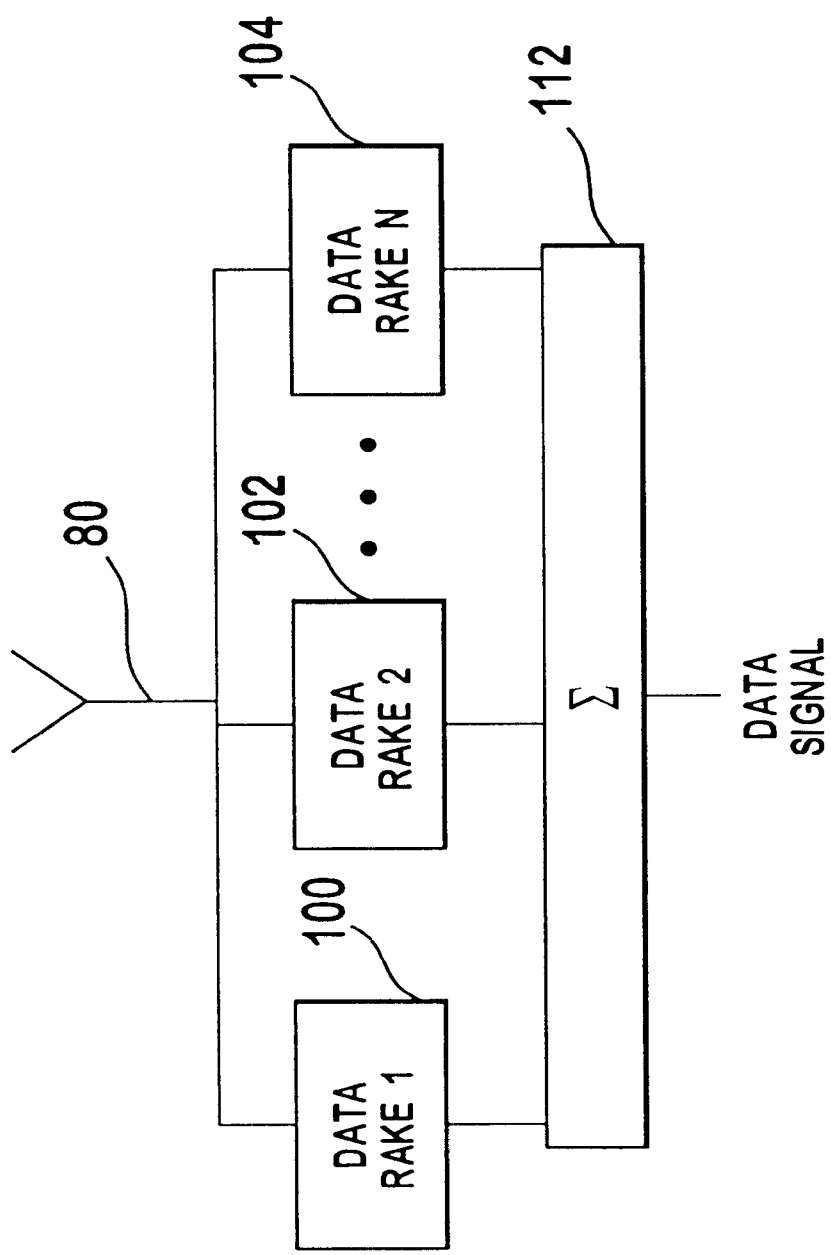
FIG. 17 is the data receiving circuit used with the transmitter of FIG. 14.

FIG. 17 depicts the data signal receiving circuit for the beam steering transmitter of FIGS. 15 and 16. Since the transmitted signal has already been weighted, the data signal receiving circuit does not require the weighting devices 106–110 of FIG. 6.

The advantage of the invention's beam steering are twofold. The transmitted data signal is focused toward the target receiver improving the signal quality of the received signal. Conversely, the signal is focused away from other receivers reducing interference to their signals. Due to both of these factors, the capacity of a system using the invention's beam steering is increased. Additionally, due to the adaptive algorithm used by the pilot signal receiving circuitry, the weights are dynamically adjusted. By adjusting the weights, a data signal's beam will dynamically respond to a moving receiver or transmitter as well as to changes in the multipath environment.

In a system using the same frequency for downlink and uplink signals, such as time division duplex (TDD), an alternate embodiment is used. Due to reciprocity, downlink signals experience the same multipath environment as uplink signals send over the same frequency. To take advantage of reciprocity, the weights determined by the base station's receiver are applied to the base station's transmitter. In such a system, the base station's receiving circuit of FIG. 18 is co-located, such as within a base station, with the transmitting circuit of FIG. 19.

Figure 18:
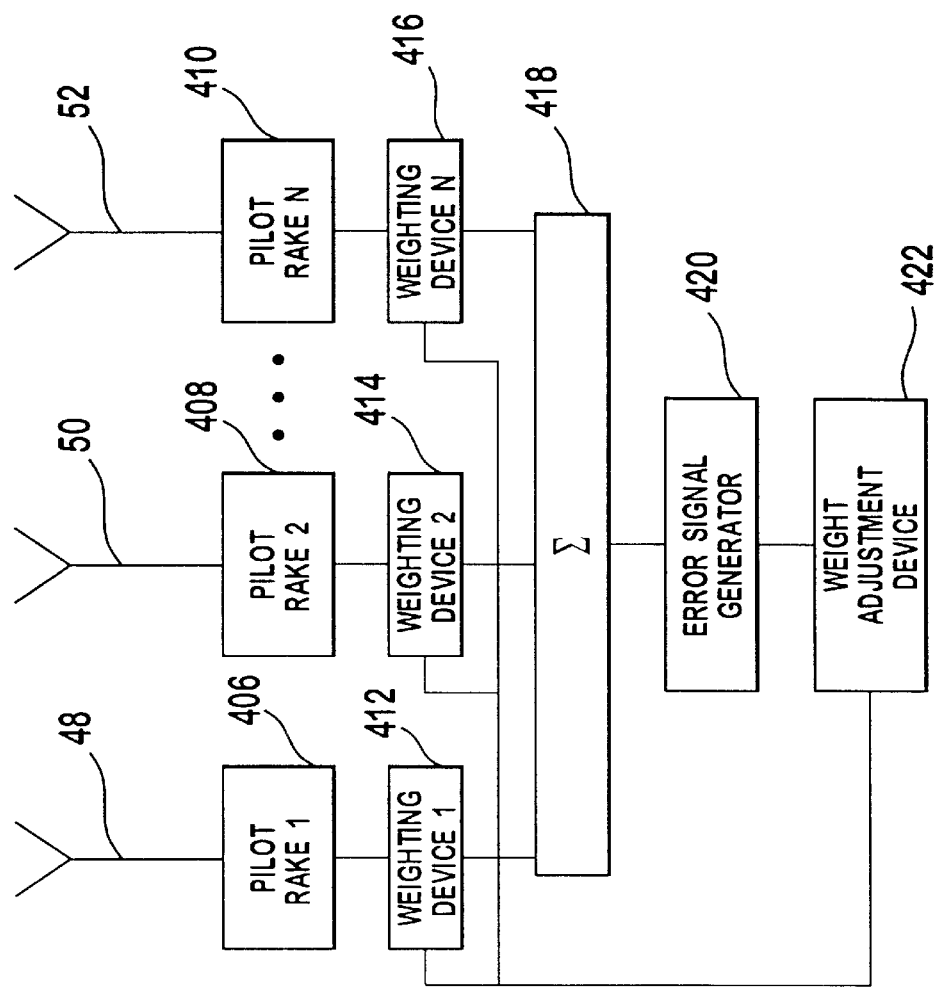
FIG. 18 is a pilot signal receiving circuit used when uplink and downlink signals use the same frequency.

In the receiving circuit of FIG. 18, each antenna 48–52 receives a respective pilot signal sent by the UE. Each pilot is filtered by a RAKE 406–410 and weighted by a weighting device 412–416. The weighted and filtered pilot signals are combined by a combiner 418. Using the error signal generator 420 and the weight adjustment device 422, the weights associated with the weighting devices 412–416 are adjusted using an adaptive algorithm.

Figure 19:
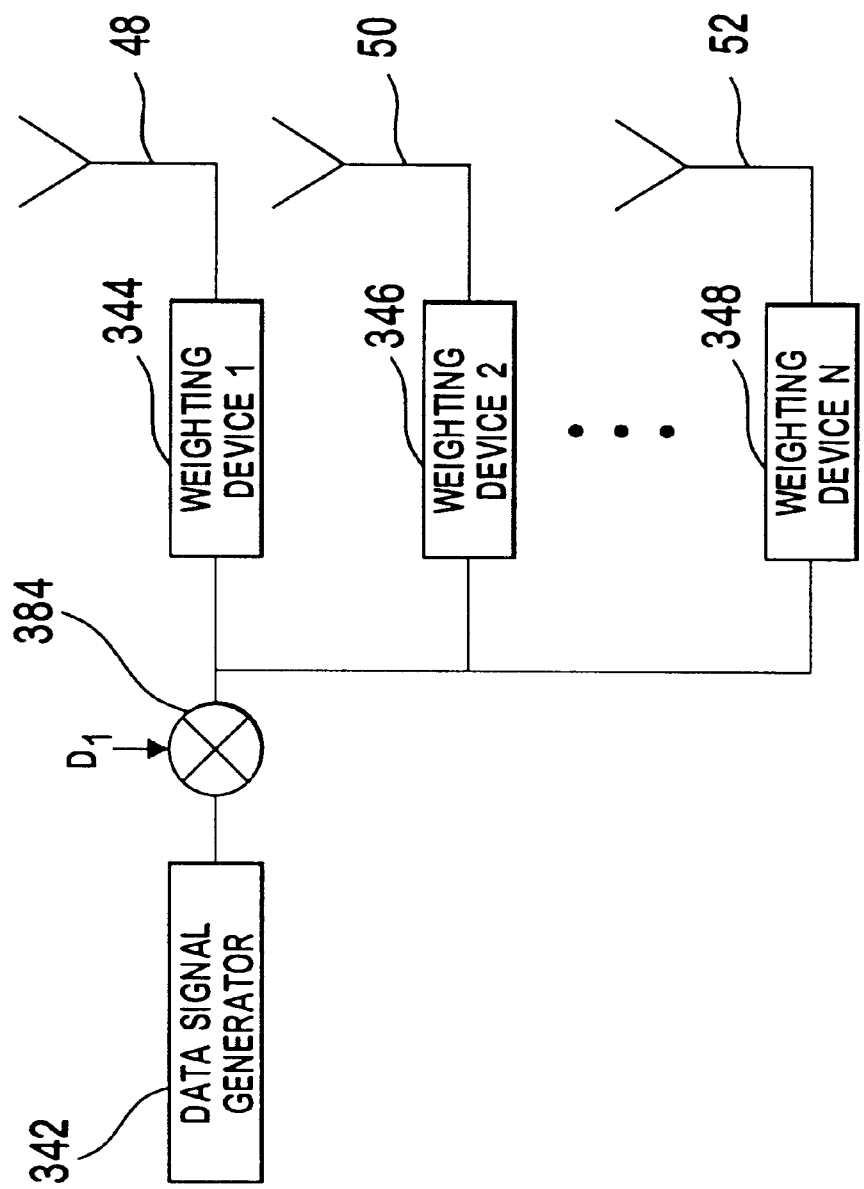
FIG. 19 is a transmitting circuit used with the pilot signal receiving circuit of FIG. 18.

The transmitting circuit of FIG. 19 has a data signal generator 342 to generate a data signal. The data signal is spread using mixer 384. The spread data signal is weighted by weighting devices 344–348 as were determined by the receiving circuit of FIG. 19 for each virtual channel.

Figure 20:
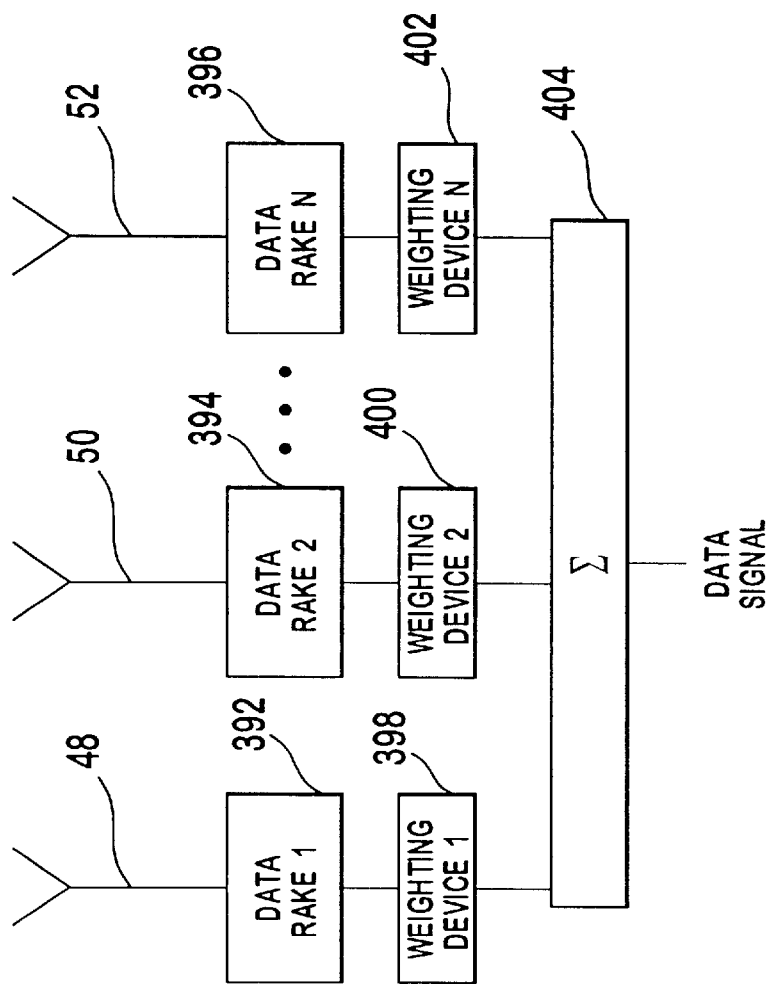
FIG. 20 is a data signal receiving circuit used with the pilot signal receiving circuit of FIG. 18.

The circuit of FIG. 20 is used as a data signal receiving circuit at the base station. The transmitted data signal is received by the multiple antennas 48–52. A data RAKE 392–396 is coupled to each antenna 48–52 to filter the data signal. The filtered data signals are weighted by weighting devices 398–402 by the weights determined for the corresponding antenna's received pilot and are combined at combiner 404 to recover the data signal. Since the transmitter circuit of FIG. 19 transmits the data signal with the optimum weights, the recovered data signal at the UE will have a higher signal quality than provided by the prior art.

An adaptive algorithm can also be used to reduce interference in received signals for a spread spectrum communication system. A transmitter in the communication system, which can be located in either a base station 20 to 32 or UE 34 to 36, transmits a spread pilot signal and a traffic signal over the same frequency spectrum. The pilot signal is spread using a pilot code, P, and the traffic signal is spread using a traffic code, C.

Figure 21:
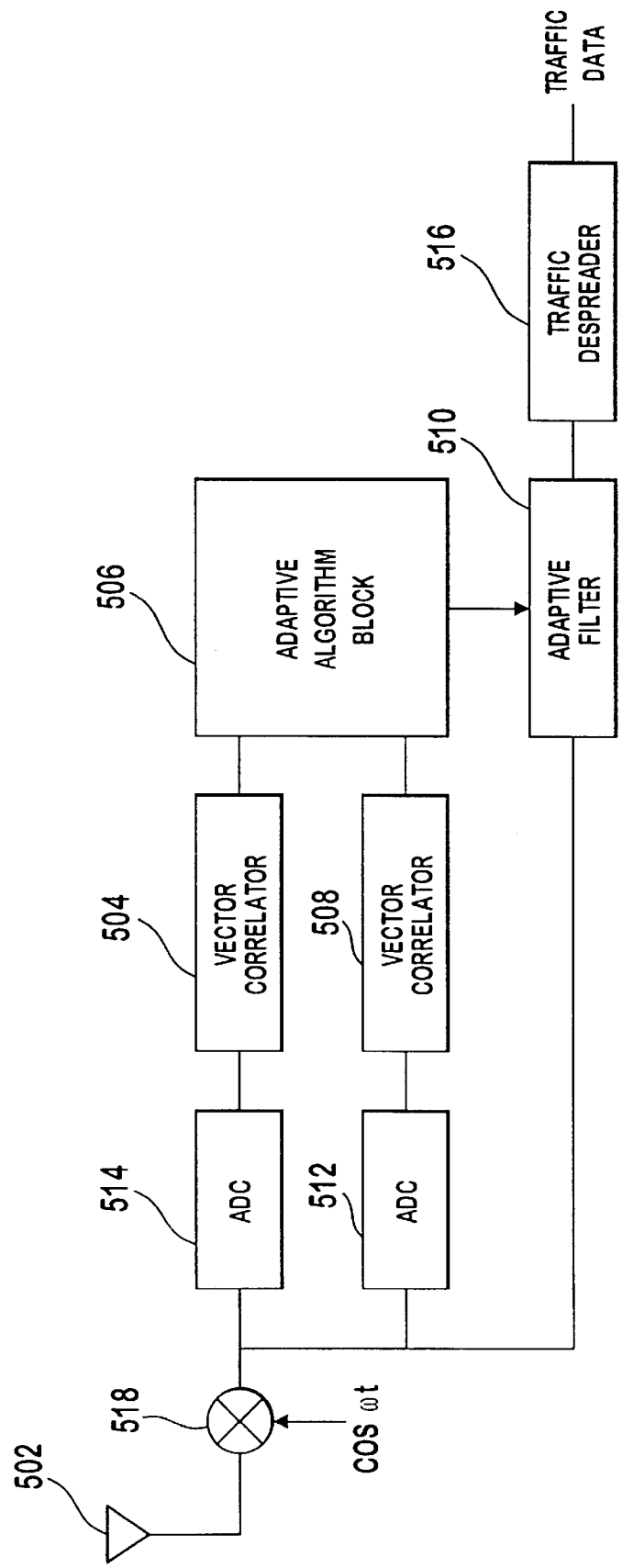
FIG. 21 is a simplified receiver for reducing interference.

The simplified receiver 500 of FIG. 21 receives both the pilot and traffic signals using an antenna 502. The received signals are demodulated to a baseband signal by a demodulator 518. The baseband signal is converted into digital samples, such as by two analog to digital converters (ADC) 512, 514. Each ADC 512, 514 typically samples at the chip rate. To obtain a half-chip resolution, one ADC 514 is delayed with respect to the other ADC 512 by a one-half chip delay. The samples are processed by a filtering device, such two vector correlators 504, 508 as shown in FIG. 21 or a RAKE, to process the pilot signal. The vector correlators 504, 508, are used to despread various multipath components of the received pilot signal using the pilot code, P. By using two vector correlators 504, 508 as in FIG. 21, each half-chip component is despread, such as for a 10 chip window to despread 21 components. Each despread component is sent to an adaptive algorithm block 506 to determine an optimum weight for each despread component to minimize interference in the received pilot signal. The adaptive algorithm block 506 may use a minimum mean square error (MMSE) algorithm such as a least mean square error algorithm.

Figure 22:
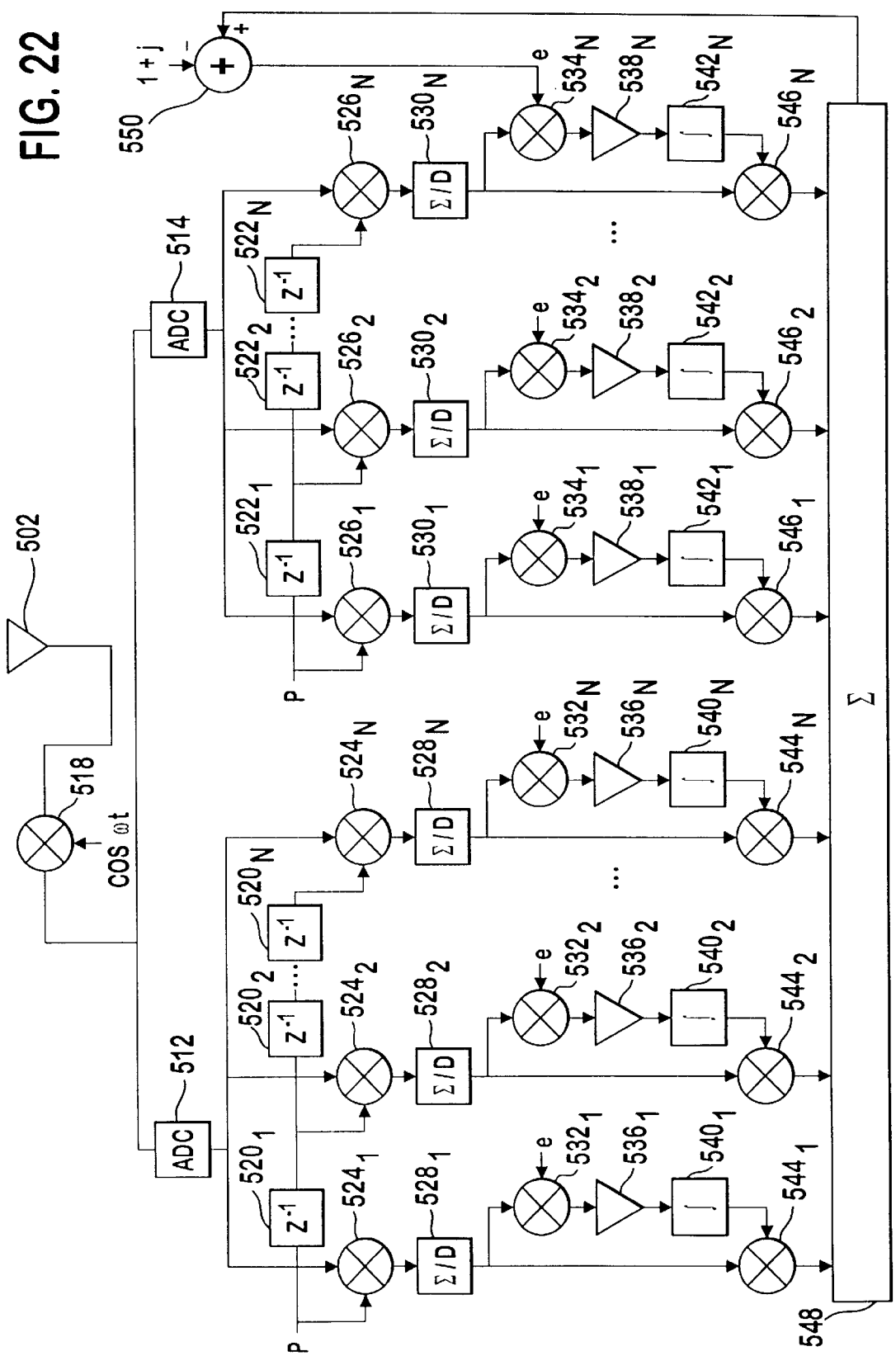
FIG. 22 is an illustration of a vector correlator/adaptive algorithm block using a least mean square error algorithm.

One combination vector correlator/adaptive algorithm block using a LMS algorithm and half-chip resolution is shown in FIG. 22. The pilot code is delayed by a group of delay devices $520_1$ to $520_N$ and $522_1$ to $522_N$. Each of the ADC samples is despread such as by mixing it with timed versions of the pilot code, P, by mixers $524_1$ to $524_N$ and $526_1$ to $526_N$. The mixed signals are processed by sum and dump circuits $528_1$ to $528_N$ and $530_1$ to $530_N$ to produce despread components of the pilot signal. By using two ADCs 512, 514 with a half-chip sampling delay and two vector correlators 504, 508, despread components at half-chip intervals are produced such as 21 components for a 10 chip window. Each despread version is weighted by a weight, $W_{11}$ to $W_{2N}$, such as by using a weighting device, $544_1$ to $544_N$ and $546_1$ to $546_N$. The weighted versions are combined, such as by using a summer 528. The combined signal is compared to the complex transmitted value of pilot signal, such as 1+j for a pilot signal in the third generation wireless standard, to produce an error signal, e. The comparison may be performed by a subtractor 550 by subtracting the combined signal from the ideal, 1+j. The error signal, e, is mixed using mixers $532_1$ to $532_N$ and $534_1$ to $534_N$ with each despread version. Each mixed version is amplified and integrated, such as by using an amplifier $536_1$ to $536_N$ and $538_1$ to $538_N$ and an integrator $540_1$ to $540_N$ and $542_1$ to $542_N$. The amplified and integrated results are refined weights, $W_{11}$ to $W_{2N}$, for further weighting of the despread versions. Using the least mean square algorithm, the weights, $W_{11}$ to $W_{2N}$, will be selected as to drive the combined signal to its ideal value.

The received signal is also processed by an adaptive filter 510 with the weights, $W_{11}$ to $W_{2N}$, determined for the pilot signal components. Since the pilot signal and the traffic signal are transmitted over the same frequency spectrum, the two signals experience the same channel characteristics. As a result, the pilot weights, $W_{11}$ to $W_{2N}$, applied to the traffic signal components reduces interference in the received traffic signal. Additionally, if the pilot and channel signals were sent using orthogonal spreading codes, the orthogonality of the received channel signal is restored after weighting. The restored orthogonality substantially reduces correlated interference from other traffic channels that occurs as a result of the deorthogonalization due to channel distortion. The weighted received signal is despread by a traffic despreader 516 using the corresponding traffic code to recover the traffic data.

What is claimed is:

1. A method for receiving a traffic signal in a code division multiple access communication system, the system transmitting a pilot signal and a traffic signal over a shared spectrum, the pilot and traffic signal having an associated code, the method comprising:

receiving signals over the shared spectrum;

sampling the received signals to produce samples;

despreading the samples with delayed versions of a pilot code to produce a window of despread pilot code window samples, the window having evenly time spread samples;

determining a weight for each despread pilot code window sample using a least mean squares algorithm; and processing the received signal with the determined weights and despreading the processed received signal to recover data of the traffic signal.

2. The method of claim 1 wherein the evenly spaced samples are evenly spaced at half chip intervals.

3. The method of claim 2 wherein the window spans ten chips.

4. The method of claim 1 wherein the adaptive algorithm comprises comparing a combination of the despread pilot code window samples with an ideal value to produce an error signal and using the error signal to determine the weight for each despread pilot code window sample.

5. The method of claim 4 wherein the ideal value is 1+j.

6. A user equipment for use in code division multiple access communication system, the system having a base station transmitting a pilot and traffic signal over a shared spectrum, the pilot and traffic signal having an associated code, the user equipment comprising:

means for receiving signals over the shared spectrum;

means for sampling the received signals to produce samples;

means for despreading the samples with delayed versions of a pilot code to produce a window of despread pilot code window samples, the window having evenly time spread samples;

means for determining a weight for each despread pilot code window sample using a least means squares algorithm; and means for processing of the received signal with the determined weights and despreading the processed received signal to recover data of the traffic signal.

7. The user equipment of claim 6 wherein the evenly spaced samples are evenly spaced at half chip intervals.

8. The user equipment of claim 7 wherein the window spans ten chips.

9. The user equipment of claim 6 wherein the adaptive algorithm comprises comparing a combination of the despread pilot code window samples with an ideal value to produce an error signal and using the error signal to determine the weight for each despread pilot code window sample.

10. The user equipment of claim 9 wherein the ideal value is 1+j.

11. A receiver for use in a code division multiple access communication system, the system transmitting a pilot and traffic signal over a shared spectrum, the pilot and traffic signal having an associated code, the receiver comprising:
  an antenna for receiving signals over the shared spectrum;
  an analog to digital converter for sampling the received signals over the shared spectrum;
  a first plurality of despreaders for despreading the samples with delayed versions of a pilot code to produce a window of despread pilot code window samples, the window having evenly time spaced samples;
  an adaptive algorithm block for determining a weight for each despread pilot code window sample using a least mean squares algorithm; and
  an adaptive filter for processing the received signal with the determined weights to produce a weighted received signal; and
  a despreader for despreading the weighted received signal to recover data of the traffic signal.

12. The receiver of claim 11 wherein the analog to digital converter comprises two analog to digital converters sampling at a half chip separation, the two analog digital converters sampling at the chip rate.

13. The receiver of claim 12 wherein the window spans ten chips.

14. The receiver of claim 11 wherein the adaptive algorithm comprises comparing a combination of the despread pilot code window samples with an ideal value to produce an error signal and using the error signal to determine the weight for each despread pilot code window sample.

15. The receiver of claim 14 wherein the ideal value is 1+j.

16. A method for receiving a traffic signal in a code division multiple access communication system, the system transmitting a pilot signal and a traffic signal over a shared spectrum, the pilot and traffic signal having an associated code, the method comprising:
  receiving signals over the shared spectrum;
  sampling the received signals to produce samples;
  despreading the samples with delayed versions of a pilot code to produce a window of despread pilot code window samples, the window having evenly time spread samples;
  determining a weight for each despread pilot code window sample using a minimum mean square error algorithm; and
  processing the received signal with the determined weights and despreading the processed received signal to recover data of the traffic signal.

17. A user equipment for use in code division multiple access communication system, the system having a base station transmitting a pilot and traffic signal over a shared spectrum, the pilot and traffic signal having an associated code, the user equipment comprising:
  means for receiving signals over the shared spectrum;
  means for sampling the received signals to produce samples;
  means for despreading the samples with delayed versions of a pilot code to produce a window of despread pilot code window samples, the window having evenly time spread samples;
  means for determining a weight for each despread pilot code window sample using a minimum means square error algorithm; and
  means for processing of the received signal with the determined weights and despreading the processed received signal to recover data of the traffic signal.

18. A receiver for use in a code division multiple access communication system, the system transmitting a pilot and traffic signal over a shared spectrum, the pilot and traffic signal having an associated code, the receiver comprising:
  an antenna for receiving signals over the shared spectrum;
  an analog to digital converter for sampling the received signals over the shared spectrum;
  a first plurality of despreaders for despreading the samples with delayed versions of a pilot code to produce a window of despread pilot code window samples, the window having evenly time spaced samples;
  an adaptive algorithm block for determining a weight for each despread pilot code window sample using a minimum means square error algorithm; and
  an adaptive filter for processing the received signal with the determined weights to produce a weighted received signal; and
  a despreader for despreading the weighted received signal to recover data of the traffic signal.

* * * * *